April 27, 1954 R. J. JOHNSON 2,676,491
LATITUDE CORRECTION FOR GYROS
Filed Nov. 13, 1948
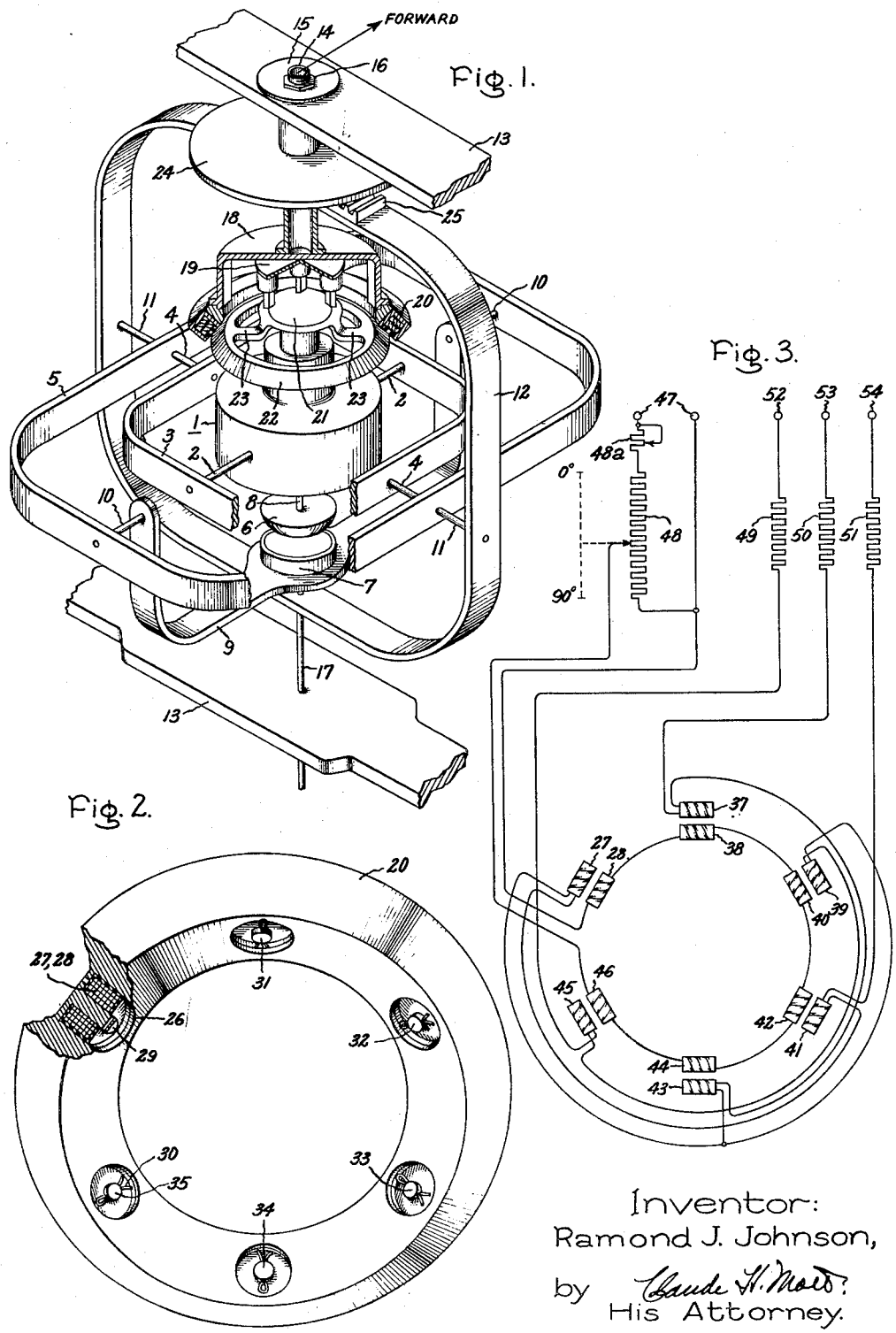
Inventor:
Ramond J. Johnson,
by Claude H. Mott
His Attorney.

Patented Apr. 27, 1954

2,676,491

UNITED STATES PATENT OFFICE 2,676,491

LATITUDE CORRECTION FOR GYROS

Ramond J. Johnson, Schenectady, N. Y., assignor to General Electric Company, a corporation of New York Application November 13, 1948, Serial No. 59,832

10 Claims. (Cl. 74—5.42)

1

The present invention relates to gyroscopes, and more particularly to an improved means for correcting latitude errors in gyro verticals adapted to be mounted on ships, aircraft, and other moving vehicles.

Gyroscopes, commonly referred to as gyro verticals, are widely used to provide a reference of the vertical direction or horizontal plane for indication or control purposes, or both. Because the spin axis of a gyroscope tends to wander slowly due to bearing friction, rotation of the earth, etc., it is necessary to provide an erection system for maintaining the spin axis of the gyroscope in the reference position. The erection system usually comprises a pendulum positioned by gravity and means controlled by the position of the pendulum relative to the gyro for slowly precessing the gyro into the reference position indicated by the pendulum.

In a highly accurate device of this character, the rotation of the earth introduces an error which varies with the latitude since the axis of a spinning gyro tends to remain fixed in space but not necessarily fixed with relation to the surface of the earth and thus its axis appears to continuously tilt toward the west. This apparent movement of the gyro axis could be overcome by the gyro erecting system if the force exerted by the erecting magnet were made strong enough. But the magnetic force would then be so strong that the gyro would follow the short-period swings of the magnet instead of remaining in the average position. Therefore a separate precessing force to move the top of the gyro axis towards the east is applied to the gyro for this purpose. Since the required force is different in different latitudes, this correction is known as the "latitude correction."

It is an object of this invention to provide simple and improved means for correcting latitude errors in gyro verticals.

Another object is to provide improved latitude correction means which operate directly from a ship's gyro compass without any need for self-synchronous motors.

Still another object is to provide latitude correction means which can be controlled without reaching inside the gimbal case and without the need of the usual complicated external controlling equipment.

A further object is to provide a gyro vertical having torque exerting means which is fixed with respect to the stabilized element of the gyroscope.

The invention will be more fully understood by referring now to the accompanying drawing wherein:

Fig. 1 is a perspective, partly-sectional view of a gyro vertical provided with a latitude correction system arranged in accordance with the present invention.

Fig. 2 is a perspective, partly-sectional view of a coil assembly, the details of which are not fully apparent from Fig. 1; and Fig. 3 is a schematic circuit diagram showing how the coils of Fig. 2 are connected and energized.

Heretofore, gyro verticals either had manually adjusted correctors for latitude in which a self-synchronous motor was carried on the main gimbal system or on the gravity control member, or a self-synchronous motor was carried on the stabilized system and exerted a magnetic pull on the gyro casing, or automatic power-driven correctors of a complicated nature also mounted directly on the gimbal system. This resulted in increased weight, size and complexity, especially since it was necessary to orient the corrector into a definite and constant relation to the true north, regardless of the turning of the ship, as the latitude error always occurs in the east-west plane. This necessitated the turning of the whole corrector mechanism by means of a compass controlled repeater motor, resulting in many complications or in the need for reaching into the sensitive parts of the machine each time it was necessary to make an adjustment for a change in latitude.

While some systems overcome certain of the above complications, they possess other undesirable features such as the unnecessary restriction of gyro casing movement relative to the stable element.

The present invention obviates the need for reaching into the instrument, provides for simple external setting of latitude and is arranged to require no self-synchronous motors.

Referring to Fig. 1 of the drawing, I have shown a gyro vertical for mounting on a naval ship but which is suitable for mounting on any moving vehicle, such as an aircraft. As used on ships such a gyroscope may be connected to suitable torque amplifiers to stabilize fire control equipment. On aircraft, the gyroscope may be used to indicate the pitch and bank attitude of the aircraft and also, if desired, to control the pitch and bank channels of an automatic pilot.

As shown, the gyroscope comprises a rotor bearing casing 1 which houses a gyroscope rotor (not shown). The gyro bearing casing is pivoted for movement about a horizontal axis by means of trunnions 2 which are fixed in a gyro gimbal 3. The gimbal 3 is in turn pivoted for movement about a horizontal axis perpendicular to the axis of trunnions 2 by means of trunnions 4 which pass through a magnet gimbal 5.

In order to provide means for erecting the gyroscope there is provided an eddy current erection system comprising a rotating eddy current disk 6 and a cooperating magnet 7. The eddy current disk 6 is mounted on a rotating shaft 8 which may be an extension of the gyro rotor shaft itself.

Magnet 7, which cooperates with the eddy current disk 6, is pendulously mounted beneath the disk so that it is free to swing in any direction under the influence of gravity and acceleration forces acting thereon. To this end the magnet 7 is centrally mounted on a bail 9 which is pivotally mounted on magnet gimbal 5 by means of trunnions 10. Connected through gimbal 5 are trunnions 11 which are coaxial with trunnions 4 and which extend and are fixed to a rotating gimbal 12.

Gimbal 12 is supported from pitch gimbal 13 and is adapted to rotate about a vertical axis. The support for example may comprise a collared shaft 14 fixedly mounted to the pitch gimbal 13 by means of a washer 15 and lock nut 16. Gimbal 12 may be supported by a suitable bearing on a shoulder (not shown) of the shaft 14 and rotated in any suitable manner, for example, by means of a shaft 17 journaled through the lower extremity of pitch gimbal 13 and adapted to be driven by a suitable motor. Thus it will be seen that the entire gyroscope gimbal system together with the erecting system are all carried in a rotating gimbal 12, which may be rotated continuously at some constant speed, for example, 6 R. P. M. The purpose of this rotating feature is to decrease the effect of any unbalance of the gyroscope system and the erecting system by averaging out the effects of small, unbalanced stray torques. The rotating gimbal 12 is carried in the pitch gimbal 13 which is power driven by a follow-up servo system in a manner well known to those skilled in the art. The pitch gimbal 13 is the reference which it is desired to stabilize so that it at all times indicates the true vertical.

Attached to the lower end of shaft 14 is a coil assembly support 18 which is rigidly fixed with respect to shaft 14 and therefore with respect to pitch gimbal 13. The support 18 provides a framework for carrying two groups of electromagnetic coil asemblies. An inner assembly 19 is made up of pick up coils which are utilized in a well known manner to stabilize the roll and pitch gimbals of the gyroscope. Since the particular manner of stabilizing roll and pitch gimbals of a gyroscope is not a part of this invention, and is well known, it will only be necessary to point out that the usual means are provided whereby the pitch gimbal 13 is stabilized to provide a vertical reference at all times. Surrounding the group of pick up coils 19, are six other coils comprising the second assembly. This second assembly of coils is mounted in an annular ring of magnetic material 20 in a manner to be more fully explained in connection with the description of its details as illustrated by Fig. 2. The magnetic ring 20 is rigidly supported to the frame 18.

Mounted on top of the gyro casing 1 are two circular armatures 21 and 22. These armatures are of course stationary with respect to the gyro casing 1 and are symmetrically mounted so as to be concentric with the spin axis of the gyro rotor. The two armatures are interconnected by insulating members 23 and are disposed in cooperative relation with the poles of the two coil assemblies. The armature 22 may simply be an annular ring of magnetic material such as iron which is so positioned as to be subject to magnetic attraction by the poles of the coils associated therewith as will be hereinafter more fully explained. It is so mounted on the gyro casing as to enjoy universal freedom of movement without restriction or interference from coil assemblies.

It will be noted from Fig. 1 that the shaft 14 is hollow and may conveniently serve as an exit for the leads from the coil assemblies. However, since it is necessary to bring leads into the gyro casing for driving the rotor motor, a slip ring assembly 24 is provided for cooperative engagement with a brush assembly 25.

As is better shown in Fig. 2 of the drawing, the annular magnetic ring 20 contains six cylindrical recesses equidistantly spaced and symmetrically disposed so as to project substantially at right angles to the armature 22. Referring more particularly to the sectional portion of Fig. 2, it will be seen that the typical recess 26 contains a spool, comprising double coil windings 27, 28 which is fitted into the recess over a guide-like pole 29. The windings 27, 28 may be suitably retained on the pole 29 by means of a cotter pin 30 as shown on the pole in the adjoining recess.

The windings 27, 28 may be energized so that the pole 29 will exert a strong electromagnetic action on the armature 22. Likewise, a similar electromagnetic action may be created at each of the corresponding equidistant positions where similar coils (not shown in sectional view) surround the poles indicated as 31, 32, 33, 34 and 35.

It will be seen that the coils 27, 28 may form a single recessed unit and that there are six such units physically disposed about the supporting ring 20. The armature 22 is so positioned that its surface is perpendicular with the axis of the poles of these unit coils. The outer diameter of armature 22 is less than the diameter of a circle whose locus is traced through the tips of the poles. It will now be explained how these coil units may be utilized for latitude correction purposes by energizing them so as to cause a resultant pull at the poles in a single direction such as to precess the top of the gyro axis toward the east irrespective of the direction of motion of the ship and, of course, of the frame 18 to which it is secured.

Referring now to Fig. 3, I have shown schematically, the electrical connection of the latitude correction coil units which have been drawn to correspond to their physical position as shown in Fig. 2.

Each of the six latitude correction coil units has two windings identified as 27, 28; 37, 38; 39, 40; 41, 42; 43, 44; and 45, 46. Each of these windings has the same number of turns and, in fact, any spool may conveniently have the wires of its two windings wound simultaneously. That set of windings identified by the even numerals is connected in series and is adapted to be energized by the Own-Ship's-Course supply at the terminals 47, which on a naval vessel, for example would be 115 volts, 60 cycles. A potentiometer 48 is inserted in this series circuit so that the amount of current supplied to the even-numbered series coils by the Own-Ship's-Course supply may be controlled. An additional resistor 48a may be used for trimming purposes.

Turning now to the odd-numbered coils it will be observed that diametrically opposite pairs are connected in series and that these three pairs are then Y connected. The three legs of the Y connected circuit are connected through balancing resistors 49, 50 and 51 to the Own-Ship's-Course synchro signal supply at terminals 52, 53 and 54 which provides an electrical azimuth indication from the ship's gyro compass.

Assuming that the coils are so oriented that coil 37 leads in the direction of forward movement of the ship, then coils 37 and 43 will form one leg of the Y connection and may be energized to create a magnetic field in a forward direction in line with these coils. Likewise the coils 41 and 27 form another leg of the Y connection and may also be excited to create a magnetic field in line therewith. The third leg of the Y connection comprises the coils 45 and 39 and these also may be excited to create a magnetic field in line therewith. Since these coils are evenly spaced around a circular assembly with the coil 37 forward, this arrangement may be compared with the stator of a self-synchronous motor, commonly referred to as a synchro. Thus, for a zero Own-Ship's-Course signal, and in accordance with standard synchro practice, the magnetic field created by the currents in the respective windings will be in line with coils 37—43. Now if the ship turns through 120° to starboard, the coils 37 and 43 would also physically follow. However, the magnetic field would remain unchanged and would now be in line with coils 45—39.

Turning now to a consideration of the effect of connecting the various coils as shown in Fig. 3, it will be noted that the odd-numbered coils diametrically opposite each other, for example 37—43, are connected in series and therefore acting alone exert a balanced force on the armature 22. Likewise, the corresponding even-numbered coils are equally energized and therefore acting alone would also exert a balanced force on the armature 22. However, odd-numbered coils, 37—43 are connected so that they have the same polarity while the corresponding even-numbered coils, 38—44, are connected so that they have opposite polarity. It will therefore be evident that for a zero Own-Ship's-Course (ship headed north), fluxes in coils 37—38 will add while fluxes in coils 43—44 will subtract so that the net magnetic pull on the armature 22 is toward the north which results in precession of the gyro toward the east.

With changes in the Own-Ship's-Course signal, it will be clear that the determining magnetic force produced by the current in the unit coils is always in a direction such as to precess the gyro toward the east to give the proper latitude correction.

The net amount of force needed for latitude correction is greatest at the equator and decreases with increase in latitude. At the North or South Pole no correction would be required since a vertical gyro axis would be coaxial with the earth's axis and its apparent direction would not be affected by the earth's rotation. The degree of force exerted in the direction of the resultant magnetic field can thus be controlled by the potentiometer 48 which in turn determines the amount of current supplied to the even-numbered series coils. Potentiometer 48 may be conveniently located on a control panel external to the gimbal housing and operated by a single knob adapted to adjust the amount of latitude correction for different latitudes. While the potentiometer 48 as shown is arranged for manual adjustment, means may be provided to make this adjustment automatically as a function of latitude.

From the foregoing it will be evident that it will be unnecessary to have any complicated mechanism or self-synchronous motors located within the instrument and that changes in latitude may be effected very simply by a potentiometer externally located.

I have chosen to show the armature 22 as having an annular configuration to illustrate its advantage in cases where it is desired to rotate the gimbal 12 for the purpose of eliminating stray unbalanced torques. Obviously, the rotating frame arrangement can be eliminated however, altho it would then be necessary to have the gyroscope system precisely balanced so that the gyroscope axis will not be caused to depart from the vertical position due to unbalance torques. If the rotating gimbal 12 is eliminated it will be clear that the configuration of the armature 22 need not necessarily be circular since only that portion of the armature located directly beneath each unit coil is necessary for purposes of magnetic attraction or repulsion and that portion which is located between coils may be omitted. If the rotating gimbal 12 is omitted, roll stabilization may be applied directly to the magnet gimbal 5 in a well known manner.

It will of course be obvious to those skilled in the art that the elements shown and described are merely illustrative and that various changes and modifications may be made without departing from the true spirit and scope of the invention as defined by the claims which are annexed.

What I claim is:

1. In a self-erected gyro vertical, a rotor mounted in a casing universally suspended by gimbals from a stabilized frame, magnetizable armature means mounted upon said casing in an annular region about the axis of said rotor, an electromagnetic assembly including coils in attractive relation with said armature means and fixed with respect to said stabilized frame for exerting a net magnetic force on said armature means in a single direction whereby said gyro is precessed to the east, and external means for controlling the strength of said force.

2. In a self-erected gyro vertical, a rotor mounted in a casing universally suspended by gimbals from a stabilized frame, magnetizable armature means mounted upon said casing in an annular region about the axis of said rotor, an annular framework attached to said stabilized frame and having a plurality of coils disposed about said framework coacting to exert an electromagnetic force on said armature means in a predetermined direction so as to precess said gyro towards the east, and means for controlling the energization of said coils.

3. In a self-erected gyro vertical, a rotor mounted in a casing universally suspended by gimbals from a stabilized frame, a magnetic support rigidly suspended from said stabilized frame, a plurality of windings symmetrically mounted on said support and adapted to be energized so as to produce a resultant magnetic field in a single direction irrespective of the space orientation of said gyro vertical, magnetizable armature means mounted upon said casing in an annular region about the axis of said rotor, said resultant magnetic field exerting a directional torque on said armature means, and means for controlling the value of said torque.

4. In a latitude correction means for a gyro vertical adapted to be mounted upn a movable craft, a universally mounted free gyro encased in a housing suspended from a frame by gimbals, an annular magnetizable armature fixed upon said housing, means for erecting said gyro including a magnet, a coil supporting framework fixed to said frame, means for stabilizing said frame including pick up coils supported by said framework, means fixed to said framework comprising a second assembly of coils positioned around said armature in a plurality of mutually interacting pairs, adjustable means for energizing one coil of each said pair independently of craft attitude, and means responsive to directional heading of said craft for variably energizing the other coil of each said pair thereby continually to exert an electromagnetic force upon said armature in a direction to precess said gyro to the east.

5. In a self-erected gyro vertical mounted on a moving vehicle having compass means for electrically producing a reference signal regardless of the space orientation of said vehicle, a rotor mounted in a casing universally suspended by gimbals from a stabilized frame, magnetizable armature means mounted upon said casing in an annular region about the axis of said rotor a magnetic support rigidly suspended from said stabilized frame, six unit coils symmetrically spaced on said support and adapted to be energized from said compass means to produce a unidirectional torque on said armature means in response to said reference signal whereby said gyro is precessed to the east, and means for varying said torque.

6. A device in accordance with claim 5 wherein, each of said unit coils further comprise two windings, one of each of said coil windings being connected for energization in series, the remainder of said windings being Y connected.

7. In combination, a rotor mounted in a casing universally suspended by gimbals from a stabilized frame, directional torque means comprising an assembly of electromagnetic coils fixed to and equi-radially disposed about the supporting axis of said stabilized frame, means for rotating said universally suspended gimbals about said above axis for eliminating any unbalance torques, an annular magnetizable armature mounted upon said gyro casing and disposed to remain in the magnetic path of said electromagnetic coils during rotation thereof, said coils being energized to exert a torque on said moving armature which will precess said gyro exclusively to the east and means for controlling the value of said torque.

8. Latitude correction means in a self-erected gyroscope comprising in combination, a stabilized frame, a support rotatably suspended from said frame and adapted to be revolved about a vertical axis, a rotor mounted in a housing universally suspended by a gimbal system, said gimbal system being connected for rotation by said rotatably suspended support, a magnetic ring supported upon said housing, a series of electromagnetic coils fixed to said stabilized frame and disposed in cooperative relation with said magnetic ring and adapted for energization to produce a magnetic torque on said ring in a direction whereby the top of said gyro is precessed toward the east and resistance means for adjusting the degree of energization.

9. In combination, a gyro mounted in a casing universally suspended by gimbals from a stabilized frame, a gravity responsive means for erecting said gyro, an iron ring mechanically connected to said casing, means for exerting a torque on said ring comprising, magnetic coil-carrying means rigidly supported to said frame, a plurality of coils equi-radially disposed on said carrying means about the axis of support from said frame, each of said coils further comprising a first group of windings and a second group of windings, the first windings each being equally energized, the second windings being Y connected, and the second windings co-acting with the first windings to exert a resultant torque on said ring in a direction to precess said gyro to the east and means for controlling the degree of energization of said first windings.

10. Apparatus in accordance with claim 9 wherein said controlling means further comprises a potentiometer which may be located remotely for adjustment in accordance with latitude.

References Cited in the file of this patent

UNITED STATES PATENTS

| Number | Name | Date |
|---|---|---|
| 1,529,720 | Rosenbaum | Mar. 17, 1925 |
| 2,133,793 | Anscott et al. | Oct. 18, 1938 |
| 2,293,039 | Esval | Aug. 18, 1942 |
| 2,417,081 | Lynn | Mar. 11, 1947 |
| 2,435,581 | Greenland | Feb. 10, 1948 |
| 2,519,459 | Hanna et al. | Aug. 22, 1950 |
| 2,534,824 | Jones | Dec. 19, 1950 |